United States Patent [19]
Yata et al.

[11] 3,922,692
[45] Nov. 25, 1975

[54] EXPOSURE TIME CONTROL DEVICE FOR USE IN SINGLE LENS REFLEX CAMERA

[75] Inventors: Kotaro Yata, Ikeda; Yasuhiro Nanba, Sakai; Masayoshi Sahara, Tokyokawa, all of Japan

[73] Assignee: Minolta Camera Kabushiki Kaisha, Osaka, Japan

[22] Filed: Dec. 28, 1973

[21] Appl. No.: 429,391

[30] Foreign Application Priority Data
Dec. 28, 1972 Japan............................. 47-148516

[52] U.S. Cl................................. 354/51; 354/60 R
[51] Int. Cl.²................................................. G03B 9/62
[58] Field of Search................. 354/24, 50, 51, 60 R

[56] References Cited
UNITED STATES PATENTS

| | | | |
|---|---|---|---|
| 3,641,890 | 2/1972 | Ono | 354/24 |
| 3,750,540 | 8/1973 | Yanagisawa et al. | 354/24 |
| 3,752,045 | 8/1973 | Ono et al. | 354/24 |
| 3,810,226 | 5/1974 | Ono et al. | 354/51 |
| 3,815,148 | 6/1974 | Ikeda et al. | 354/24 |

Primary Examiner—Samuel S. Matthews
Assistant Examiner—Russell E. Adams, Jr.
Attorney, Agent, or Firm—Watson, Cole, Grindle & Watson

[57] ABSTRACT

An exposure time control device for use in a single lens reflex camera includes a switching mechanism using a pair of switches which are controlled to reduce or eliminate errors in the exposure or in the indication of the exposure. The switches operate in conjunction with a power source, a light measuring circuit, a meter circuit for indicating the exposure time determined by the light measuring circuit, a storage means for storing the logarithmic output voltage of the light measuring circuit, a converting circuit for producing an output current proportional to the anti-logarithmic value of the stored voltage, an integrating circuit for integrating the output circuit simultaneously with the commencement of the exposure, and a switching circuit which terminates exposure when the integrating circuit reaches a predetermined level. A first switch connects the converting circuit, the integrating circuit and the switching circuit to the power source and is closed and opened in association with the release operation and the actuation of the shutter closing member for terminating exposure, respectively. A second switch is closed and opened in association with the actuation of a shutter releasing member for initiating exposure and upon completion of the winding-up of the film after the termination of the exposure, respectively, for connecting and disconnecting the converting circuit to the power source. The switching mechanism enables a low input impedance to be used in the converting circuit without the introduction of errors in the exposure time.

6 Claims, 2 Drawing Figures

EXPOSURE TIME CONTROL DEVICE FOR USE IN SINGLE LENS REFLEX CAMERA

This invention relates to an exposure time control device for use in a single lens reflex camera, and more particularly to an exposure time control device for use in single lens reflex cameras. In such cameras an output voltage produced from a light measuring circuit is stored, the light measuring circuit receiving light rays passing through an objective lens and producing an output voltage proportional to a logarithmic value of the brightness of photographic object. The stored voltage is converted by an anti-logarithmically converting circuit into logarithmically expanded current, thereby controlling an exposure time. Such exposure control devices are well known.

In another type of known exposure time control device, in order that the brightness of the photographic object, which varies over a wide range, may be stored in a storage capacitor of a small capacity, a voltage proportional to a logarithmic value of the brightness of the photographic object is obtained by the light measuring circuit. The output voltage thus produced by the light measuring circuit is stored in the storage capacitor, and then provided as an input to an anti-logarithmically converting circuit so as to provide current commensurate with an anti-logarithmic value of the stored voltage. An integrating circuit is actuated by the expanded current simultaneously with the commencement of the exposure. When the voltage of the integrating circuit reaches a predetermined level, the switching circuit is actuated for terminating the exposure.

In the exposure time control device of the aforementioned types, to effect an anti-logarithmic conversion of the voltage stored in the storage capacitor, converting elements having a high internal impedance are necessary in the input circuit of the anti-logarithmically converting circuit. Field effect transistors have been used in the form of a cathode follower. Field effect transistors present a high internal impedance sufficient to maintain the stored voltage constant, until the termination of the exposure control.

Field effect transistors, however, present difficulties because their temperature characteristic changes to a great extent with temperature variations and temperature compensation is therefore needed. Additionally, because of such a great variation in this characteristic for individual field effect transistors, it is difficult to provide uniform characteristics, and therefore temperature compensation is necessary. Furthermore, the output/input ratio is not 1, such that further adjustment for correcting such a ratio is required.

OBJECTS OF THE INVENTION

It is a principal object of the present invention to provide an exposure time control device for use in a single lens reflex camera, wherein a transistor of a low internal impedance is used in the anti-logarithmically converting circuit.

Another object of the present invention is to provide an improved exposure time control device for use in a single lens reflex camera for eliminating exposure time errors, even if a transistor of a low internal impedance is used as an input transistor in the anti-logarithmically converting circuit with a uniform temperature characteristic.

In a further object of the present invention, wherein in an exposure time control device for use in a single lens reflex camera as described, the switching circuit is actuated only for controlling exposure time, thereby preventing unwanted consumption of the battery power source.

A still further object of the present invention is to provide an exposure time control device for use in a single lens reflex camera as described wherein a transistor of low internal impedance is used as an input transistor in an antilogarithmically converting circuit, there will arise no fluctuation in the exposure time to be indicated by the meter circuit even with changes in the load presented to the light measuring circuit.

SUMMARY OF THE INVENTION

The exposure time control device of the present invention is used with a single lens reflex camera having the following components. A light measuring circuit receives light rays passing through an objective lens and produces an output voltage proportional to the logarithmic value of the brightness of a photographic object. A meter circuit indicates exposure time from the output voltage produced by the light measuring circuit. A storage means stores the output voltage produced by the light measuring circuit. A converting circuit produces an output current obtained by anti-logarithmically converting the voltage stored by the storage means and the output current is integrated by an integrating capacitor simultaneously with the commencement of the exposure. A switching circuit is actuated to terminate the exposure when the voltage of the integrating capacitor reaches a predetermined level. One pole of a power source is connected to a light measuring circuit, a meter circuit and a storage means. A first switch is closed in association with the release operation and also in association with the operation of a shutter closing member to complete the connection of the meter circuit, the light measuring circuit, and the switching circuit. The emitter of an input transistor in the anti-logarithmically converting circuit is connected by a second switch to the power source through the first switch and is closed in association with the commencement of actuation of a shutter releasing member and opened in association with the completion of the winding-up of a film after the termination of the exposure.

The first and second switches enable the internal impedance of the input transistor in the anti-logarithmically converting circuit to be decreased without adversely affecting the operation of the exposure control device, which is a major feature of these switches. For example, assume that the first and second switches both remain closed. Then, because of the lowered internal impedance of the input transistor, the light measuring circuit would be affected by the current flowing through the base-emitter of the transistor when the switch interposed between the light measuring circuit and the storage means is closed; thereby resulting in a failure to produce a desired output voltage proportional to a logarithmic value of the brightness of the photographic object. Further, because the switch interposed between the light measuring circuit and the storage means is not opened until the exposure starts, there is leakage of the voltage stored by the storage means through the base-emitter of the input transistor, thereby decreasing the accuracy of that voltage.

Now, assume that the second switch is closed in association with the commencement of the actuation of the shutter releasing member, and is opened in association with the completion of the winding-up of the film while the first switch usually remains closed. Under such a condition, if it is desired to detect an exposure time commensurate with the brightness of the photographic object by the meter circuit after the termination of the exposure and prior to the completion of the winding-up of a film, the light measuring circuit will not produce an output voltage proportional to a logarithmic value of the brightness of the photographic object. That occurs because of the current flowing through the base-emitter of the intput transistor of the anti-logarithmically converting circuit, and it follows that a wrong exposure time is indicated by the meter circuit.

To avoid the possibility of such a wrong indication by the meter circuit, the first switch is so arranged as to be closed in association with the release operation and opened in association with the actuation of the shutter closing member. This is a prominent function of the operation of the first switch.

Another function of the first switch is that it disconnects the switching circuit from the power source for the time interval from the termination of the exposure until the completion of the winding-up of the film, so as to cut off the flow of current from the power source to the switching circuit, thereby preventing an unwanted consumption of the power source.

DETAILED DESCRIPTION OF THE INVENTION

Figure 1:
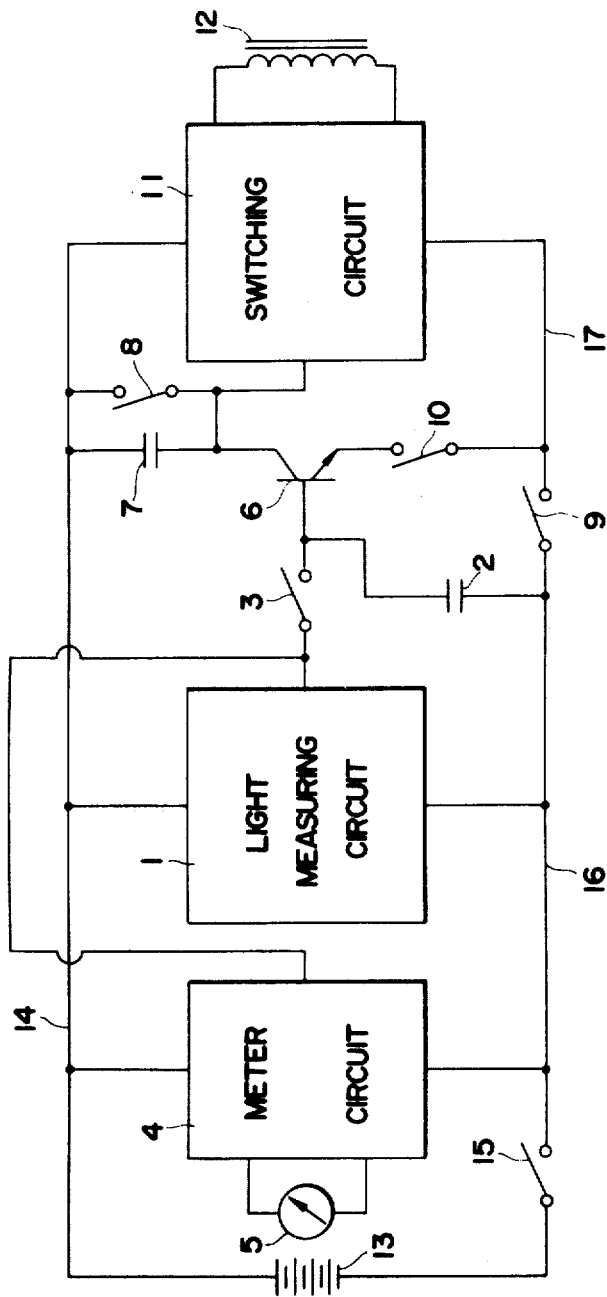
FIG. 1 is a diagram of an electric circuit of a preferred embodiment of an exposure time control device for use in a single lens reflex camera according to the present invention.

With reference to FIG. 1, light measuring circuit 1 includes therein a light receptive element receiving light rays coming through an objective lens from a photographic object, and produces an output voltage proportional to a logarithmic value of the brightness of that photographic object. One terminal of storage capacitor 2 is connected through switch 3 to the output terminal of light measuring circuit 1. Switch 3 is normally closed and is opened before a movable mirror or other like mechanism is shifted from a viewing position to a picture taking position by the operation of a camera actuating member. Meter circuit 4 receives the output voltage of light measuring circuit 1 so as to indicate on meter 5 an exposure time commensurate with the brightness of a photographic object.

One terminal of storage capacitor 2, to which the light measuring output is input, is connected to the base of transistor 6 in the anti-logarithmically converting circuit, which produces a current proportional to the anti-logarithm of the voltage stored by the storage capacitor. The collector of transistor 6 is connected to an integrating circuit which consists of capacitor 7 and switch 8 for charging or discharging capacitor 7. A terminal of capacitor 7 is connected to switching circuit 11 for feeding an input thereto. Electromagnetic coil 12 which is connected to switching circuit 11 is excited by the current which is fed thereto when the voltage of capacitor 7 becomes less than a predetermined level. Electromagnet coil 12 is de-energized, when the voltage of capacitor 7 reaches a given voltage level and the current flow to a shutter closing member is cut off.

One terminal each of light measuring circuit 1, meter circuit 4, capacitor 7, switch 8, and switching circuit 11, is connected through lead wire 14 to a positive pole of potential source 13. A negative pole of potential source 13 is connected through potential source switch 15 to first lead wire 16, to which is connected the other terminals of light measuring circuit 1 and meter circuit 4. Connected to the aforesaid one terminal is the other terminal of storage capacitor 2, to which an output from light measuring circuit 1 is provided as an input through switch 3. Second lead wire 17 is connected through first switch 9 to the first lead wire 16 and is connected to the other terminal of switching circuit 11. The emitter of transistor 6 of the aforesaid anti-logarithmically converting circuit is connected through second switch 10 to second lead wire 17.

First switch 9 is closed in association with the release operation and opened in association with the operation of a shutter closing member. Second switch 10 is closed in association with the commencement of the operation of a shutter releasing member and opened in association with the completion of the winding-up of the film after the termination of exposure. The mechanism for actuating these switches will be described with reference to FIG. 2.

Figure 2:
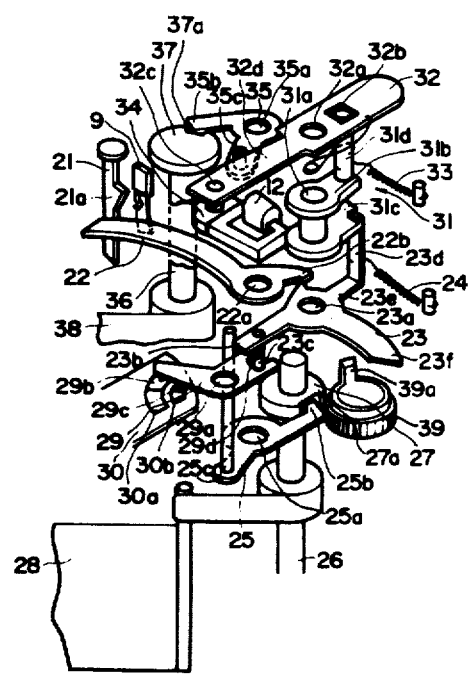
FIG. 2 is a perspective view illustrating an essential part of the exposure time control device.

Referring to FIG. 2, release button 21, which is biased upwardly, is formed with a lateral edge provided with angular projection 21a and is moved downwardly to cause a counterclockwise rotation of release lever 22 which is pivoted about through-hole 22a. First switch 9 is in engaging relationship with release lever 22 and is closed by the counterclockwise directional rotation thereof.

Control plate 23 includes pawl 23e engageable with pawl 22b of release lever 22 and is pivoted about through-hole 23a with a clockwise rotational bias provided by spring 24. Control plate 23 is rotated in a clockwise direction, when pawl 22b of release lever 22 is disengaged from pawl 23e by the counterclockwise directional rotation of release lever 22. Control plate 23 includes actuating arm 23b provided with pin 23c, control arm 23d which engages actuating member 31 to be described below, and arm 23f by which control plate 23 is cocked in association with the winding-up of the film.

Pin 23c of actuating arm 23b fits within forked portion 29d which is formed in arm 29e of switch lever 29 pivoted about through-hole 29a. Arm 29e engages with connecting pin 25c which is provided in front curtain locking lever 25 for locking front curtain 28 which is a shutter releasing member. Arm 29f of switch lever 29 is provided with contacts 29b, 29c which are slidable on printed base plate 30.

Switch 30a, disposed on printed base plate 30, on which contacts 29b, 29c slide, is actuated from a conductive position to a non-conductive position, and switch 30b is actuated from a non-conductive position to a conductive position, in the sliding directional movement of the contacts. Contact 29b and switch 30b are combined together to thereby constitute switch 8 of the integrating circuit, while contact 29c and switch 30b constitute second switch 10.

Front curtain locking lever 25, with connecting pin 25c engaging with switch lever 29, is pivoted about through-hole 25a and has locking pawl 25b formed on the other arm thereof. Locking pawl 25b is engageable with cut-away portion 27a of cam plate 27 mounted on front curtain shaft 26, around which is wound one end of front curtain 28.

A crank type actuating member 31 includes arm 31c provided with a cut-away portion engaging with control arm 23d of control plate 23 and is biased to rotate in the clockwise direction by spring 33. Actuating member 31 is pivoted about through-hole 31a coaxially with control plate 23 and includes arm 31b provided with pin 31d. Pin 31d is loosely fitted in opening 32b formed in operating plate 32 which is pivoted about through-hole 32a coaxially with actuating member 31. The other arm of operating plate 32 has armature 34 mounted thereon through hole 32c to confront electromagnetic 12. Engaged with lateral edge 32d of operating plate 32 is pin 35c provided on one arm of rear curtain locking lever 35 which is pivoted about through-hole 35a so as to lock rear curtain 38, which is a shutter closing member. Pawl 35b of the other arm of rear curtain locking lever 35 is engageable with cut-away portion 37a of cam plate 37 which is integrally and coaxially formed with rear curtain shaft 36, around which one end of rear curtain 38 is wound.

Film winding member 39 is rotated in the clockwise direction in association with the operation for winding-up a film. Film winding member 39 has projecting 39a engageable with arm 23f of control plate 23 and is designed so as to be interconnected by gears (not shown) with front and rear curtain shafts 26 and 36, thereby rotating, at the time of winding a film, in association with the rotation of both shafts.

In FIG. 2, the exposure time control device is illustrated with the film being wound-up. That is, front and rear curtains 28, 38 are wound-up around front and rear curtain shafts 26, 36, respectively, to thereby intercept the exposure light. Pawls 25b, 35b of front and rear curtain locking levers 25, 35 are in engagement with cut-away portions 27a, 37a of cam plates 27, 37, to thereby prevent the rotation of front and rear curtain shafts 26, 36, respectively. Pawl 23e of control plate 23 is in engagement with pawl 22b of release lever 22, to thereby open first switch 9. By the counterclockwise directional rotation of control plate 23, pin 23c of actuating arm 23b causes switch lever 29 to rotate in the clockwise direction, whereby switch 8 is closed to permit the discharging of capacitor 7, with second switch 10 being opened. Control arm 23d causes actuating member 31 to rotate in the counterclockwise direction against the force of spring 33. Armature 34 of operating plate 32 is biased to rotate in the same direction as actuating member 23 and abuts against electromagnet 12.

With the situation as described above, when potential source switch 15 is first closed, light measuring circuit 1 is actuated, the output voltage thereof operates meter 5 of meter circuit 4 to indicate the automatically controlled exposure time. The output voltage produced by light measuring circuit 1 is charged through switch 3 on storage capacitor 2. Then, when release button 21 is pushed slightly downwardly, thereby release lever 22 is caused to rotate in the counterclockwise direction and first switch 9 is closed. Thus, first lead wire 16 and second lead wire 17 are rendered conductive, to thereby bring switch circuit 11 into an operative condition. Second switch 10, at this stage, remains open such that the current flow between the base and emitter of transistor 6 of the anti-logarithmic conversion circuit is prevented. Subsequently, release button 21 is further urged downwardly so as to open switch 3, whereby storage capacitor 2 is disconnected from light measuring circuit 1. Simultaneously, with the disconnection of storage capacitor 2, the movable mirror (not shown) starts to shift from the viewing position to the picture taking position.

Subsequently, the further downward movement of release button 21 causes pawl 22b of release lever 22 to become disengaged from pawl 23e of control plate 23, thereby permitting control plate 23 to rotate in the clockwise direction under the action of spring 24, with pin 23c thereof engaging with switch lever 29 for rotating lever 22 in the counterclockwise direction. Thus, contact 29b is moved to open switch 8, while contact 29c closes second switch 10, whereby transistor 6 is rendered conductive to actuate the integrating circuit to commence the charging of integrating capacitor 7. Moreover, front curtain locking lever 25 is caused to rotate in the clockwise direction with the aid of connecting pin 25c, thereby disengaging pawl 25b thereof from cut-away portion 27a, and thus front curtain 28 starts travelling, and the exposure commences.

Simultaneously with the above-described movement, control arm 23d disengages from the cut-away portion, to thereby release arm 31c from its locked position. Although actuating member 31, at this stage, is prevented from rotation by electromagnetic coil 12 which is maintained excited by the actuation of switching circuit 11 which is conductive. However, rear curtain locking lever 35 still locks rear curtain shaft 36 in position so as not to rotate.

As soon as the voltage of integrating capacitor 7 reaches a predetermined level, switching circuit 11 is inverted thereby de-energizing electromagnet 12, whereupon actuating member 31 is caused to rotate in the clockwise direction under the action of spring 33. Thus, rear curtain locking lever 35 is urged by lateral edge 32d of operating plate 32 to rotate in a clockwise direction, whereby pawl 35b of locking lever 35 becomes disengaged from cut-away portion 37a, thereby permitting the travel of rear curtain 38, and thus the exposure is terminated.

Upon termination of the exposure release button 21 is returned upward by a biasing force, release lever 22 is urged in the counterclockwise direction, to thereby open first swtich 9 by means well known to those skilled in the art, such as a spring (not shown in FIG. 2). At this stage, second switch 10 still remains closed, and upon the completion of the film winding, second switch 10 is opened. Switch 3 is closed when the movable mirror returns to the viewing position.

The following is a consideration of the introduction of an error in the exposure time because the charge of storage capacitor 2, which has been charged from the time when second switch 10 has been closed simultaneously with the commencement of exposure until the voltage of integrating capacitor 7 reaches a predetermined level, is discharged across the base-emitter of transistor 6. With an increase in the brightness of the photographic object, the voltage to be charged by storage capacitor 2 increases, while the exposure time is compressed, accordingly. Conversely, with a decrease in the brightness of the photographic object, the voltage to be charged by storage capacitor 2 decreases, and the exposure time is appropriately extended.

If the amount of charge to be discharged for exposure is compared for the case where the photographic object is brighter with the case where the photographic object is dark, in terms of the exposure time being one one-thousandth second and 1 second, respectively, then the ratio of the discharging current will be 1,000 to 1, while the amount of charge to be discharged remains the same, in either case. Thus, the amount of charge to be discharged for a duration of exposure is the same whether the photographic object is bright or dark and it is maintained constant irrespective of the exposure time. For example, assuming the DC current mu-factor $h_{FE}$ of transistor 6 to 100, the capacity of storage capacitor 2 to be $2\mu f$, and the predetermined voltage level of integrating capacitor 7 being within the range of 0.5 to 0.7 volt, and further assuming that the collector current of transistor 6 at the time of exposure is $0.4\mu A$ for an exposure time of 1 second and $0.4\mu A$ for an exposure time of one one-thousandth second, then the base-emitter voltage of transistor 6, as is well known, varies by 18mv. at room temperature (about 25° C) and the base-emitter current thereof varies in magnitude twice as much as the voltage. For this reason, 18mv corresponds to 1 EV. Under the assumed conditions and considering the amount of charge to be discharged from storage capacitor 2 during the exposure time, the resultant variation in the voltage stored therein, and the accuracy of exposure affected by these factors, since the collector current for the exposure of 1 second is $0.4\mu A$, as described, then the base current at this time will be $0.4/100\mu A$. (As will be apparent from the following description, the voltage variation of storage capacitor 2 is minor, such that the discharge current thereof may be regarded as constant.). Accordingly, the amount of charge to be discharged is $4 \times 10^{-9}C$, and the resultant voltage variation of storage capacitor 2 is $2 \times 10^{-6}/4 \times 10^{-9} = 0.5$ (mv). The value, as set forth, is not dependent on the exposure time. In terms of 1mv being 1EV, then the ratio is:

$0.5mv/18mv = 0.028(EV)$.

As is apparent from the foregoing, the charge of storage capacitor 2 is discharged through the base-emitter of transistor 6 during the exposure time, such that there accrues an error of 0.028 EV. Yet, that error produces no adverse affect on the accuracy of the exposure time. This is because the error is constant, regardless of the brightness of the photographic object, i.e., the exposure time, and therefore such an error may be considered in the design of a trigger switch for use in switching circuit 11.

It will be understood that the above description is merely illustrative of the preferred embodiments of the invention. Additional modifications and improvements can be readily appreciated by those skilled in the art from the present disclosure and such modifications and improvements may fairly be presumed to be within the scope of the invention as defined by the claims which follow.

What is claimed is:

1. In an exposure time control device for use in a single lens reflex camera of the type which includes a shutter mechanism having front and rear curtains, a light measuring circuit receiving light rays passing through an objective lens and producing an output voltage representative of the value of brightness of a photographic object, a meter circuit responsive to said output voltage to indicate exposure time, storage means for storing said output voltage, a converting circuit having a low internal impedance for producing output current representative of the value of the stored voltage, an integrating circuit for integrating said output current simultaneously with the commencement of the travelling of said front curtain, a switching circuit for initiating the travelling of said rear curtain when said integrating circuit reaches a predetermined level, a power source for said light measuring circuit, said meter circuit, said integrating circuit and said switching circuit, a first lead wire connecting one pole of said power source to one terminal of each of said light measuring circuit, said meter circuit and said storage means, and a second lead wire connecting one terminal of said converting circuit to said switching circuit;

the improvement comprising switch means for preventing leakage of said stored voltage through said converting circuit except for the period of the exposure duration, said switch means including a first switch between said first and second lead wires and a second switch connected in series to said storage means and said second lead wire through said converting circuit, said first switch being closed in association with the release operation and opened in association with the commencement of the travelling of said rear curtain, and said second switch being closed in association with the commencement of the travelling of said front curtain and opened in association with the winding-up operation of the film.

2. A switching mechanism as in claim 1, wherein said converting circuit comprises a transistor circuit including a transistor having low internal impedance and a base connected to said storage means, an emitter connected to said second switch, and a collector connected to said integrating circuit.

3. A switching mechanism as in claim 2, wherein said integrating circuit comprises an integrating capacitor connected to the collector of said transistor, and a normally closed third switch for discharging said integrating capacitor, said third switch being opened in association with the actuation of the shutter releasing member for initiating movement of said front curtain and maintained opened at least until the shutter closing member initiates movement of said rear curtain, said third switch being opened prior to the closure of said second switch.

4. In an exposure time control device for use in a single lens reflex camera of the type which includes a shutter mechanism having front and rear curtains, a light measuring circuit receiving light rays passing through an objective lens and producing a first output signal representative of the brightness of a photographic object, storage means for storing said first output signal, a converting circuit having a low internal impedance for producing a second output signal representative of the stored first output signal, an integrating circuit for integrating said second output signal simultaneously with the commencement of the movement of said front curtain, a switching circuit for initiating the movement of said rear curtain when said integrating circuit reaches a predetermined level, a power source of said light measuring circuit, said integrating circuit and said switching circuit, first means connecting one pole of said power source to one terminal of each of said light measuring circuit and said storage means, and second means connecting one terminal of said converting circuit to said switching circuit;

the improvement comprising switch means for preventing leakage of said stored first output signal through said converting circuit except for the period of the exposure duration, said switch means including a first switch between said first and second connecting means and a second switch connected in series to said storage means and said second connecting means through said converting circuit, said first switch being closed in association with the release operation and opened in association with the commencement of the movement of said rear curtain, and said second switch being closed in association with the commencement of the movement of said front curtain and opened in association with the winding-up operation of the film.

5. A switching mechanism as in claim 4, wherein said converting circuit comprises a transistor circuit including a transistor having low internal impedance and a base connected to said storage means, an emitter connected to said second switch, and a collector connected to said integrating circuit.

6. A switching mechanism as in claim 5, wherein said integrating circuit comprises an integrating capacitor connected to the collector of said transistor, and a normally closed third switch for discharging said integrating capacitor, said third switch being opened in association with the actuation of the shutter releasing member for initiating movement of said front curtain and maintained opened at least until the shutter closing member initiates movement of said rear curtain, said third switch being opened prior to the closure of said second switch.

* * * * *